B. PRICE.
SHADE WINDER.
APPLICATION FILED DEC. 22, 1906.
915,111.
Patented Mar. 16, 1909.
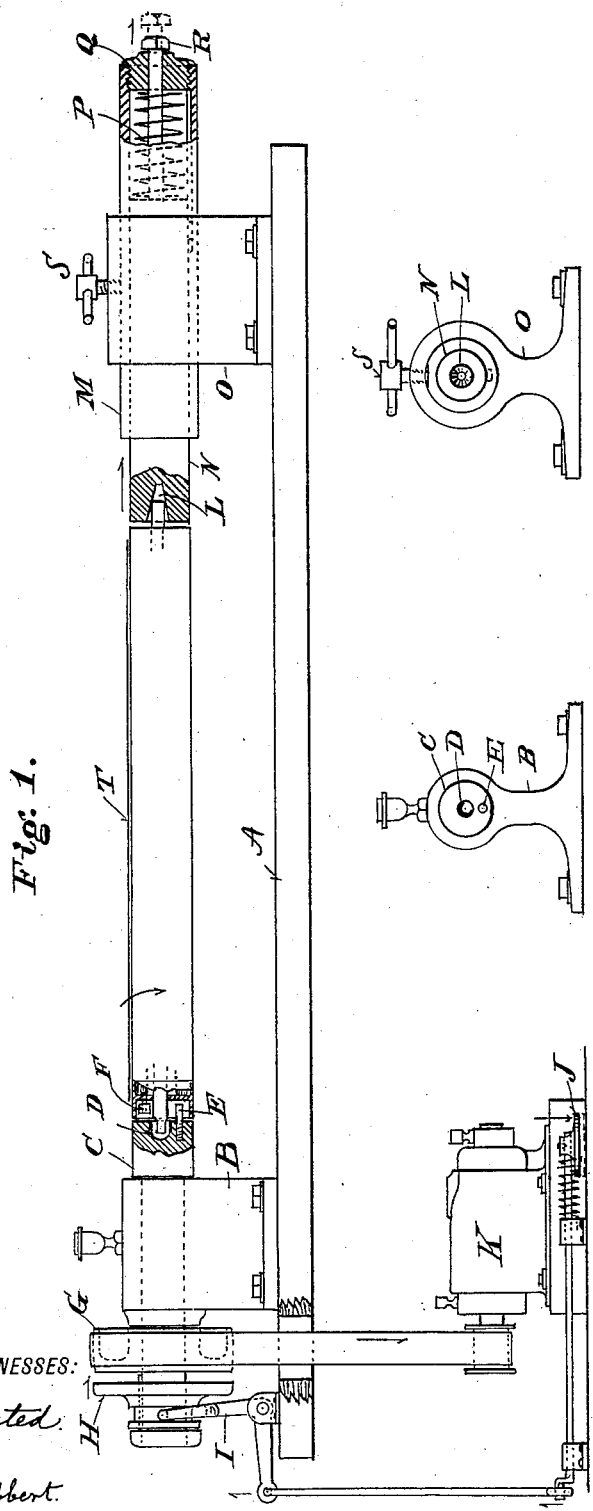

UNITED STATES PATENT OFFICE.

BERTHOLD PRICE, OF ST. LOUIS, MISSOURI.

SHADE-WINDER.

No. 915,111.   Specification of Letters Patent.   Patented March 16, 1909.

Application filed December 22, 1906. Serial No. 349,077.

*To all whom it may concern:*

Be it known that I, BERTHOLD PRICE, a citizen of the United States, residing at No. 3831 Russel avenue, in the city of St. Louis and State of Missouri, have invented a new and useful Shade-Winder, of which the following is a specification.

This invention relates to certain new and useful improvements in shade winders, the peculiarities of which will be hereinafter fully described by specifications and pointed out in the claims.

The object of my invention is to provide a machine that will quickly and easily wind the shades on the rollers in the manufacture of window shades.

Referring to the accompanying drawing on which are like reference letters indicating corresponding parts: Figure 1, represents a side elevation and partial section of my machine. Fig. 2, represents an end view of the rotatable shaft and its bearing, and Fig. 3, represents a similar end view of the support for the opposite end of the roller.

The letter A designates a table or other suitable base on which is mounted a box B in which is rotatably mounted a shaft C having a hole D in the center at one end adapted to receive the stem of a shade roller of the Hartshorn or other style. A pin, or projection E from the end of the said shaft, at one side of the center is adapted to engage with the pawl F, or other portion of the roller in order to rotate the roller with the shaft. The end of the shaft is of the same diameter as that of the roller, so that the shade when being wound upon the roller will not interfere with the shaft should the shade over-lap at the end of the process of winding. A loose pulley G is mounted upon said shaft, and is engaged by a clutch consisting of a face plate H operated by a crank I through a foot treadle J, connected by a suitable rod and crank to the crank I. The loose pulley is belted to a small motor K, or other source of power; thus it runs constantly, and immediately rotates the shaft C when the friction clutch is operated. The other end of the roller is carried in a cylindrical support N, having a center hole L to receive the other stem of the roller. This support is practically of the same diameter as the roller and is adapted to slide or move axially preferably by being mounted in a sleeve M carried in a box O supported by the said base. This slide support has a spring tendency toward the roller by means of a coil spring P within the sleeve, pressing against the support and the closing plug Q through which the reduced end of the support projects and is provided with a nut R to limit the forward motion under the pressure of the spring. The sleeve is held in place by a turn screw S. It can thus be adjusted to suit varying lengths of rollers of considerable difference.

The roller is mounted in the machine by sliding backward in the direction of the arrow, the spring-actuated sliding support, when inserting the stem of the roller at the tapering center hole L. This allows the other end of the roller to be engaged by the rotatable shaft and its pin E when inserting the stem of the roller in the hole D in said shaft. A touch of the foot upon the treadle J will cause the clutch H to engage the loose driving pulley G under rotation of the motor K and thus rotate the shaft C engaged thereby, and wind up the shade indicated by the letter T, Fig. 1, upon the roller as indicated by the arrow.

It is evident that a large amount of time and labor is saved in the winding of shades by the use of this machine, resulting in cheapness of manufacture.

Any suitable mechanism for driving the shaft C may be employed, but it is preferred to use electric power, which can be readily controlled. The right hand end support of the roller is preferably stationary, since the stem of the roller has a bearing in the center hole L.

Having thus fully described my invention what I claim as new, and desire to secure by Letters Patent, is:

1. A device for winding window shades on their rollers comprising a support, a rotatable shaft fixedly mounted on said support of substantially the same diameter as the shade roller, said shaft being provided with means adapted to engage one end of the roller and hold the same for rotation with said shaft, a second shaft held against rotation and yieldably supported on the support, said shaft being of substantially the same diameter as the shade roller, and means for adjusting said second shaft relatively to said first mentioned shaft.

2. A device for winding shade rollers comprising a support, a bearing thereon, a rotatable shaft journaled in said bearing of substantially the same diameter as the shade roller, said shaft being provided with an opening in the end thereof adapted to receive the stem on one end of the shade roller and with a projecting pin at one side of said opening, a driving member, a clutch for connecting the driving member and rotatable shaft, a second boxing supported on the support, a longitudinally adjustable sleeve mounted in said boxing, a shaft of substantially the same diameter as the shade roller loosely supported in said sleeve, said shaft being provided with an opening in the end thereof adapted to receive the stem on the other end of the shade roller, and a spring mounted in said sleeve and adapted to normally force said shaft outward.

BERTHOLD PRICE.

Witnesses:
 BIRDIE EHMFELD,
 J. Z. BURGEE.